United States Patent

Riefe et al.

Patent Number: 5,709,605
Date of Patent: Jan. 20, 1998

[54] SHAFT COUPLING

[75] Inventors: Richard Kremer Riefe; James Richard Salois, both of Saginaw; Donald Henry Mashue, Midland, all of Mich.

[73] Assignee: General Motors Corporation, Detroit, Mich.

[21] Appl. No.: 773,245

[22] Filed: Dec. 23, 1996

[51] Int. Cl.$^6$ .................................................. F16D 3/52
[52] U.S. Cl. .............................................. 464/83; 464/162
[58] Field of Search ........................... 464/81, 82, 83, 464/86, 89, 91, 162

[56] References Cited

U.S. PATENT DOCUMENTS

| | | | |
|---|---|---|---|
| 2,381,770 | 8/1945 | Overly | 464/162 |
| 2,560,958 | 7/1951 | King . | |
| 2,706,388 | 4/1955 | Potgieter | 464/86 X |
| 2,712,742 | 7/1955 | Neidhart | 464/83 |
| 3,136,142 | 6/1964 | Zeidler | 464/86 |
| 3,408,829 | 11/1968 | Gage . | |
| 3,554,045 | 1/1971 | Littmann | 464/83 X |
| 3,621,675 | 11/1971 | Conaghan et al. | 464/83 |
| 3,663,046 | 5/1972 | Reiner et al. . | |
| 3,729,953 | 5/1973 | Wanzer | 464/82 X |
| 3,757,601 | 9/1973 | Burke | 74/492 |
| 4,020,651 | 5/1977 | Callies | 464/162 X |
| 4,269,043 | 5/1981 | Kizu et al. . | |
| 4,308,728 | 1/1982 | Croset | 464/83 |
| 4,357,137 | 11/1982 | Brown | 464/75 |
| 4,406,641 | 9/1983 | Mallet | 464/162 |
| 4,898,566 | 2/1990 | Hakansson | 464/167 |
| 5,348,345 | 9/1994 | Dykema et al. | 280/777 |
| 5,560,650 | 10/1996 | Woycik et al. | 464/162 X |

FOREIGN PATENT DOCUMENTS

| | | | |
|---|---|---|---|
| 1249781 | 11/1960 | France | 464/162 |
| 1230626 | 12/1966 | Germany | 464/162 |
| 1272050 | 7/1968 | Germany | 464/162 |

*Primary Examiner*—Daniel P. Stodola
*Assistant Examiner*—Eileen A. Dunn
*Attorney, Agent, or Firm*—Saul Schwartz

[57] ABSTRACT

A shaft coupling between telescopically overlapped ends of a first shaft and a second shaft including a plurality of inside linear grooves in the first shaft, a plurality of outside linear grooves in the second shaft cooperating with the inside linear grooves in defining a plurality of linear cylindrical passages between the first and the second shafts, and an elastomeric bearing in each of the linear cylindrical passages consisting of a pair of barrel-shaped lugs at opposite ends of an integral beam spring. The barrel-shaped lugs couple together the first and the second shafts for unitary rotation about and for relative linear translation in the direction of a longitudinal centerline of the shaft coupling. The inside and outside grooves bear tangentially against the barrel-shaped lugs. The beam springs maintain substantially zero angular lash between the first and the second shafts by resiliently tipping the barrel-shaped lugs endwise in the linear cylindrical passages.

2 Claims, 2 Drawing Sheets

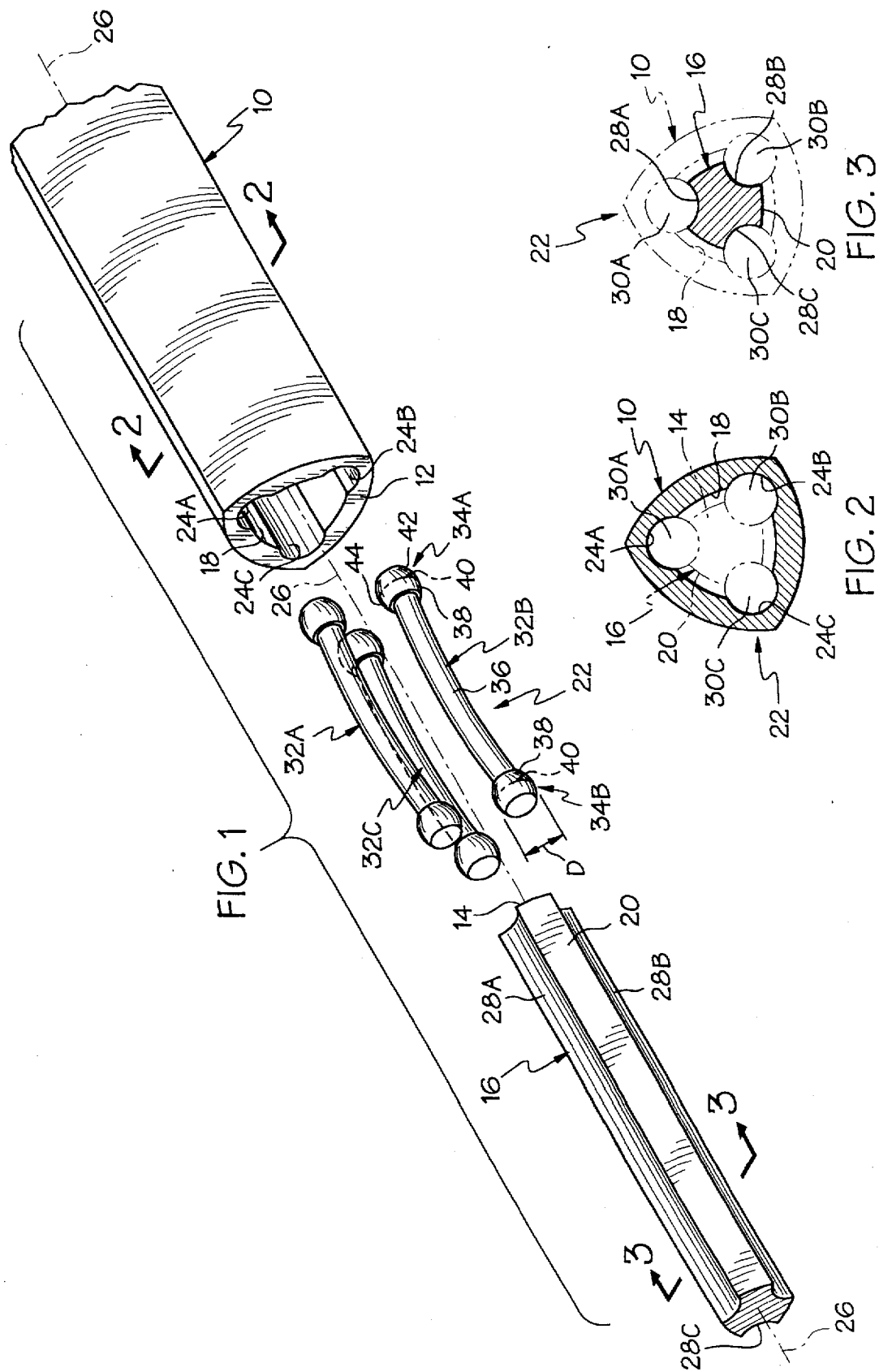

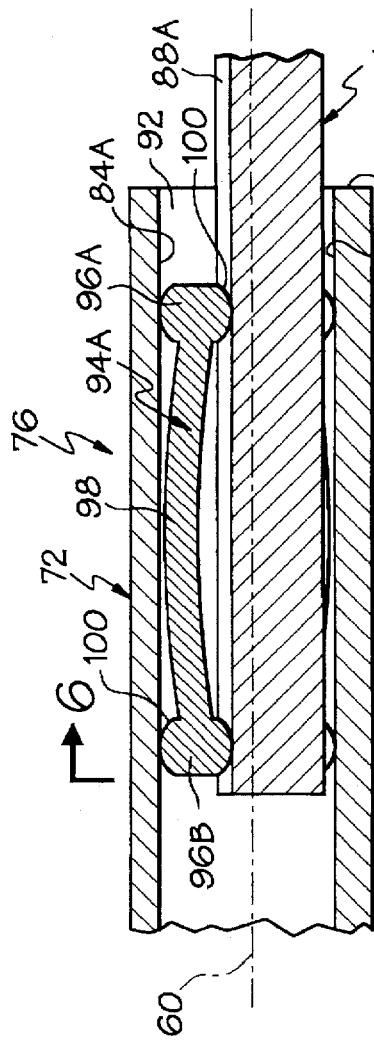
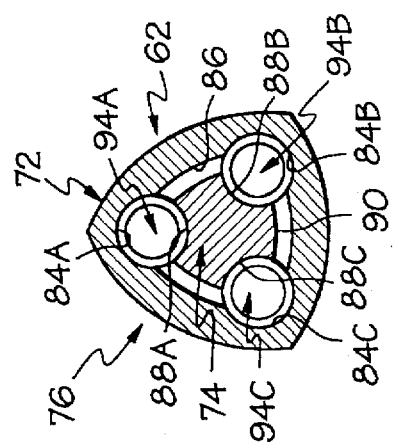
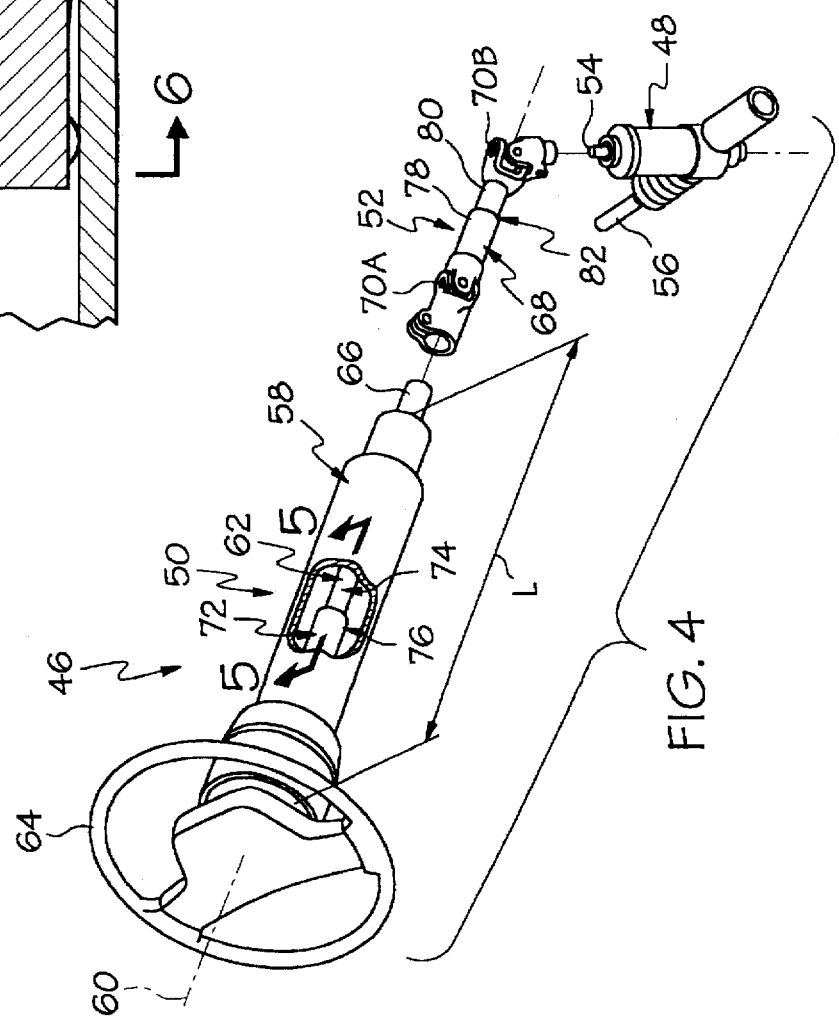

SHAFT COUPLING

TECHNICAL FIELD

This invention relates to a shaft coupling.

BACKGROUND OF THE INVENTION

U.S. Pat. No. 3,757,601, issued Sep. 11, 1973 and assigned to the assignee of this invention, describes a motor vehicle steering column having a shift tube consisting of a tubular lower shaft, a tubular upper shaft, and a shaft coupling between telescopically overlapped ends of the tubular upper and lower shafts. The shaft coupling consists of a plurality of linear grooves in the tubular lower shaft and a plurality of cylindrical springs in pockets in the tubular upper shaft which expand radially into the linear grooves. The cylindrical springs couple together the tubular upper and lower shafts for unitary rotation with zero angular lash and slide in the linear grooves to accommodate foreshortening of the shift tube concurrent with an energy-absorbing collapse stroke of the steering column. A shaft coupling according to this invention is a novel alternative to the shaft coupling described in the aforesaid U.S. Pat. No. 3,757,601.

SUMMARY OF THE INVENTION

This invention is a new and improved shaft coupling between telescopically overlapped ends of a first shaft and a second shaft including a plurality of inside linear grooves in the first shaft, a plurality of outside linear grooves in the second shaft facing the inside linear grooves in the first shaft and cooperating therewith in defining a plurality of linear cylindrical passages between the first and the second shafts, and a bearing in each of the linear cylindrical passages made of an elastomer having a low coefficient of sliding friction and consisting of a pair of barrel-shaped lugs at opposite ends of an integral beam spring. The barrel-shaped lugs couple together the first and the second shafts for unitary rotation about and for relative linear translation in the direction of a longitudinal centerline of the shaft coupling. The inside and outside grooves bear tangentially against the barrel-shaped lugs. The beam springs maintain substantially zero angular lash between the first and the second shafts by resiliently tipping the barrel-shaped lugs endwise in the linear cylindrical passages to continuously thrust diagonally opposite sides of an outside surface of each barrel-shaped lug into respective ones of the inside and outside linear grooves to eliminate dimensional clearance.

BRIEF DESCRIPTION OF THE DRAWINGS

FIG. 1 is an exploded perspective view of a generic shaft coupling according to this invention;

FIG. 2 is a sectional view taken generally along the plane indicated by lines 2—2 in FIG. 1;

FIG. 3 is a sectional view taken generally along the plane indicated by lines 3—3 in FIG. 1;

FIG. 4 is a fragmentary, exploded perspective view of a motor vehicle steering system having therein a shaft coupling according to this invention;

FIG. 5 is an enlarged sectional view taken generally along the plane indicated by lines 5—5 in FIG. 4; and FIG. 6 is a sectional view taken generally along the plane indicated by lines 6—6 in FIG. 5.

DESCRIPTION OF THE PREFERRED EMBODIMENT

Referring to FIGS. 1-3, a first shaft 10 has an end 12 telescopically overlapping an end 14 of a second shaft 16 with an inside wall 18 of the first shaft 10 facing an outside wall 20 of the second shaft 16. A shaft coupling 22 according to this invention, illustrated generically in FIGS. 1-3, between the first shaft 10 and the second shaft 16 includes a plurality of inside linear grooves 24A, 24B, 24C in the inside wall 18 of the first shaft arrayed evenly around a longitudinal centerline 26 of the shaft coupling and a corresponding plurality of outside linear grooves 28A, 28B, 28C in the outside wall 20 of the second shaft likewise arrayed evenly around the longitudinal centerline 26.

Each of the linear grooves 24A-24C is concave in lateral cross section, i.e., concave in a plane perpendicular to the longitudinal centerline 26 of the shaft coupling, and is open through the end 12 of the first shaft. Each of the linear grooves 28A-28C is concave in lateral cross section and is open through the end 14 of the second shaft. The linear grooves 24A-24C in the first shaft face the linear grooves 28A-28C in the second shaft and cooperate therewith in defining a plurality of linear cylindrical passages 30A, 30B, 30C between the first and the second shafts 10, 16.

The shaft coupling 22 further includes a plurality of identical bearings 32A, 32B, 32C in respective ones of the linear cylindrical passages 30A, 30B, 30C, each made of an elastomer such as SANTOPRENE (manufactured by Advanced Elastomer Systems of Detroit, Mich.) having a low coefficient of sliding friction. Each bearing 32A-32C consists of a pair of barrel-shaped lugs 34A, 34B at opposite ends of an integral beam spring 36. An outside surface 38 of each of the barrel-shaped lugs 34A, 34B is a convex surface of revolution around a longitudinal centerline of the barrel-shaped lug having a circular belt line 40 where a diameter dimension "D" of the outside surface is maximum. The maximum diameter dimension "D" of each of the barrel-shaped lugs is nominally the same as the diameter of the linear cylindrical passages 30A, 30B, 30C so that the linear inside grooves and linear outside grooves nominally bear tangentially against the outside surfaces 38 of the barrel-shaped lugs at the belt line 40 of each.

With the bearings 32A-32C disposed in the linear cylindrical passages 30A-30C, the barrel-shaped lugs 34A, 34B couple together the first and the second shafts 10, 16 for unitary rotation about and for relative linear translation in the direction of the longitudinal centerline 26 of the shaft coupling. As the bearings 32A-32C are inserted in the linear cylindrical passages, such as by being pushed between the inside and outside linear grooves through the end 12 of the first shaft, the linear grooves tip each interconnected pair of barrel-shaped lugs 34A, 34B endwise into substantial linear alignment against a restoring force induced by flexure of the corresponding beam spring 36. After the bearings achieve positions completely within the overlap between the ends 12, 14 of the first and the second shafts 10, 16, the aforesaid restoring forces maintain the barrel-shaped lugs tipped in the linear cylindrical passages to continuously minimize angular lash between the first and the second shafts.

For example, the aforesaid nominal tangential engagement of the inside and outside linear grooves 24B, 28B on the barrel-shaped lug 34A of the bearing 32B at its belt line 40 may not be achieved due to clearance attributable to manufacturing tolerance or to abrasion related to relative linear translation between the first and the second shafts 10, 16. In that circumstance, the beam spring 36 of the bearing 32B maintains the barrel-shaped lug 34A tipped endwise in the linear cylindrical channel 30B to thrust a first side 42 of the outside surface 38 of the barrel-shaped lug on one side of its belt line 40 into the inside linear groove 24B and a diagonally opposite second side 44 of the outside surface 38 on the other side of the belt line 40 into the outside linear groove 28B to eliminate such clearance.

Referring to FIG. 4, a fragmentarily illustrated representative motor vehicle steering system 46 includes a steering gear 48, a steering column 50, and an intermediate steering shaft 52. The steering gear 48 has a rotatable input shaft 54 and gears, not shown, which convert rotation of the input shaft 54 to linear translation of a steering rack 56 of the steering gear linked in conventional fashion to steered wheels, not shown, of the motor vehicle. The steering column 50 includes a tubular housing 58 having a length dimension "L" in the direction of a longitudinal centerline 60 of the steering column, a rotatable steering shaft 62, and a steering wheel 64 rigidly attached to the steering shaft. A lower end 66 of the steering shaft 62 protrudes beyond the bottom of the tubular housing 58. The intermediate steering shaft 52 spans the gap between the lower end 66 of the steering shaft 62 and the steering gear input shaft 54 and includes a shaft 68 and a pair of universal joints 70A, 70B at opposite ends of the shaft 68 through which the latter is connected to the steering shaft 62 and to the steering gear input shaft 54.

In order to accommodate foreshortening of the length dimension "L" of the tubular housing 58 of the steering column for adjustment or concurrent with an energy-absorbing collapse stroke of the housing, the steering shaft 62 consists of an upper shaft 72 and a lower shaft 74 interconnected by a shaft coupling 76 according to this invention. Similarly, in order to accommodate foreshortening of the shaft 68 required to install the intermediate steering shaft 52 between the steering shaft 62 and the steering gear input shaft 54, the shaft 68 consists of an upper shaft 78 and a lower shaft 80 interconnected by a shaft coupling 82 according to this invention identical to the shaft coupling 76.

Referring to FIGS. 5-6, the shaft coupling 76 includes a plurality of inside linear grooves 84A, 84B, 84C in an inside wall 86 of the upper shaft 72 arrayed evenly around the longitudinal centerline 60 of the steering column 50 and of the shaft coupling and a corresponding plurality of outside linear grooves 88A, 88B, 88C in an outside wall 90 of the lower shaft likewise arrayed evenly around the longitudinal centerline 60. Each of the linear grooves 84A-84C, 88A-88C is concave in lateral cross section. The linear inside grooves 84A-84C in the upper shaft face the linear outside grooves 88A-88C in the lower shaft and cooperate therewith in defining a plurality of linear cylindrical passages between the first and the second shafts, only one linear cylindrical passage 92 being visible in FIG. 5.

The shaft coupling 76 further includes a plurality of identical bearings 94A, 94B, 94C in respective ones of the cylindrical linear passages each made of an elastomer such as SANTOPRENE having a low coefficient of sliding friction. Each bearing 94A-94C consists of a pair of barrel-shaped lugs 96A, 96B at opposite ends of an integral beam spring 98. An outside surface 100 of each of the barrel-shaped lugs 96A, 96B is a convex surface of revolution around a longitudinal centerline of the barrel-shaped lug having a circular belt line where the diameter of the outside surface is maximum. The maximum diameter of the barrel-shaped lugs is nominally the same as the diameter of the linear cylindrical passages so that the linear inside and outside grooves nominally bear tangentially against the barrel-shaped lugs at a circular belt line of each corresponding to the maximum diameter of the outside surface 100.

With the bearings 94A-94C disposed in the linear cylindrical passages, the barrel-shaped lugs couple together the upper and the lower shafts 72, 74 for unitary rotation about and for relative linear translation in the direction of the longitudinal centerline 60. As the bearings 94A-94C are inserted in the linear cylindrical channels, such as by being pushed between the inside and outside linear grooves through an end 102 of the upper shaft 72, the linear grooves tip each interconnected pair of barrel-shaped lugs 96A, 96B endwise into substantial linear alignment against a restoring force induced by flexure of the corresponding beam spring 98. After the bearings achieve positions completely within the overlap between the ends of the upper and the lower shafts, the aforesaid restoring forces maintain the barrel-shaped lugs tipped in the linear cylindrical passages to continuously minimize angular lash between the upper and the lower shafts 72, 74 as described above with respect to the generic shaft coupling 22.

We claim:

1. A shaft coupling between a first shaft having an inside wall and a second shaft telescopically overlapping an end of said first shaft and having an outside wall facing said inside wall of said first shaft comprising:

a plurality of concave inside linear grooves in said inside wall of said first shaft parallel to a longitudinal centerline of said shaft coupling arrayed evenly around said longitudinal centerline of said shaft coupling, a plurality of concave outside linear grooves in said outside wall of said second shaft parallel to said longitudinal centerline of said shaft coupling arrayed evenly around said longitudinal centerline of said shaft coupling, said outside linear grooves facing said inside linear grooves and cooperating therewith in defining a plurality of linear cylindrical passages between said first shaft and said second shaft parallel to said longitudinal centerline of said shaft coupling arrayed evenly around said longitudinal centerline of said shaft coupling, a pair of barrel-shaped lugs in each of said linear cylindrical passages each made of an elastomeric material having a low coefficient of sliding friction and having a convex surface of revolution about a centerline of said barrel-shaped lug defining an outside surface thereof bearing tangentially against corresponding ones of said inside linear grooves and said outside linear grooves and operative to couple together said first shaft and said second shaft for unitary rotation about said longitudinal centerline of said shaft coupling and for relative linear translation in the direction of said longitudinal centerline of said shaft coupling, and a integral beam spring integral with and between each pair of said barrel-shaped lugs, said beam spring being made of said elastomeric material and resiliently tipping each of said barrel-shaped lugs endwise to eliminate dimensional clearance between each of said barrel-shaped lugs and corresponding ones of said inside linear grooves and said outside linear grooves.

2. The shaft coupling recited in claim 1 wherein:

said elastomeric material is olefinic thermoplastic elastomer.

\* \* \* \* \*